Jan. 8, 1952 A. L. CHRISTIANSEN 2,582,007
FISH GRADING APPARATUS
Filed May 24, 1948
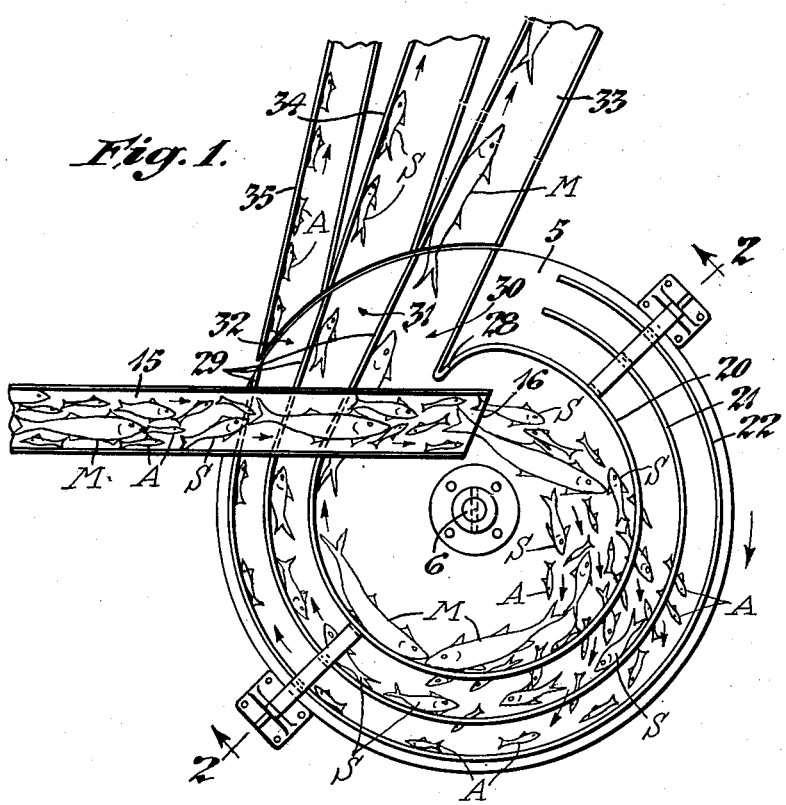
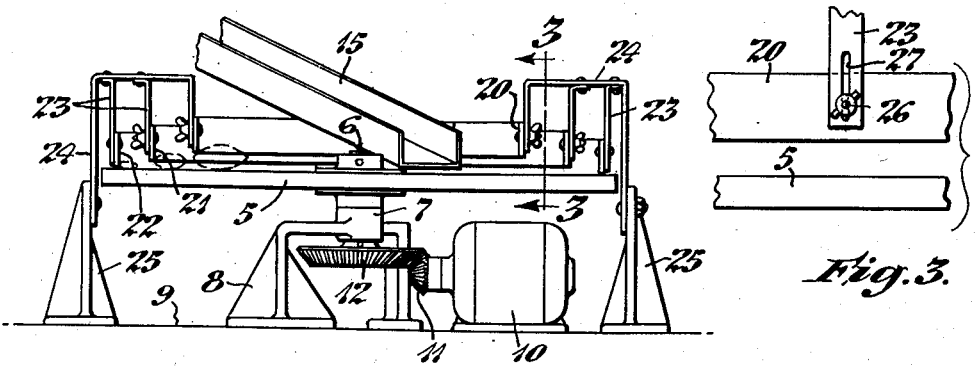
INVENTOR:
Andrew L. Christiansen
BY William C Hall
ATTORNEY.

Patented Jan. 8, 1952

2,582,007

UNITED STATES PATENT OFFICE 2,582,007

FISH GRADING APPARATUS

Andrew L. Christiansen, Compton, Calif.

Application May 24, 1948, Serial No. 28,869

2 Claims. (Cl. 209—105)

My invention relates generally to an apparatus for sorting objects according to sizes, and more particularly to an apparatus for separating fish of different sizes.

In fish-canning establishments, where several varieties of fish are canned, it is highly desirable and very important that fish be sorted according to the different varieties or species prior to being processed for canning. Since certain varieties of fish, such as mackerel, sardines, anchovies, etc., each have the characteristic of being substantially uniform in size, it is the general practice to sort the different species of the boatload or catch according to size. Various means heretofore have been proposed for sorting fish according to size, but such means have been relatively slow, have required constant attention, and have been quite inaccurate in their function, with the result that the efficiency of the cannery is impaired.

It is an important object of my invention to provide an apparatus, for sorting fish according to sizes, which is relatively simple in construction, yet highly efficient and extremely accurate in separating the fish.

Another object is to provide a fish-sorting machine which is capable of being operated at high speed so that a maximum number of fish may be operated upon per unit of time. A related object is to provide a machine, of the character referred to, which has a minimum number of moving parts, so that the machine is greatly simplified, requires practically no attention during operation, and operates over long periods of time without servicing.

Another object is to provide an apparatus of the type indicated in which the fish-separating elements are wholly adjustable to adapt the apparatus for sorting various varieties of fish, the adjustment being conveniently and quickly made so that the machine need not be shut down for an extended period of time for this purpose and the production of the cannery is not curtailed.

Another object is to provide an apparatus, of the type referred to, which consists merely in a rotatable disc upon which the batch of mixed fish is fed, the disc acting to propel the fish in an arcuate path, the fish moving simultaneously radially outward under the influence of centrifugal force into engagement with a series of curved plates arranged concentric with the axis of rotation of the disc, the plates being arranged with their lower edges spaced above the disc at distances which decrease progressively outward so that the fish of the largest variety are caused to be retained by and propelled along the innermost plate while the fish of smaller varieties move further outwardly into engagement with other plates under which they are unable to pass.

Another object is to provide an apparatus of the type specified having a series of chutes, each located in alignment with the path of movement of each variety of fish and adapted to receive the fish and to transport the same to suitable containers, or to a fish-processing apparatus.

Further objects of the invention are set forth in the following specification which describes a preferred embodiment of the invention, by way of example, as illustrated by the accompanying drawing. In the drawing:

Fig. 1 is a plan view of a fish-grading apparatus constructed in accordance with my invention;

Fig. 2 is a cross-sectional view, taken on line 2—2 of Fig. 1; and,

Fig. 3 is an enlarged vertical sectional view, taken on line 3—3 of Fig. 2.

Referring to the drawing in detail, the apparatus comprises, essentially, a circular table or disc 5 which has a vertical axle or shaft 6. The shaft 6 may be rotatable in any suitable support, the present drawing illustrating the shaft as journaled in a bearing 7 carried by a base 8 supported on the floor 9. While the shaft 6 and disc 5 may be rotated by any suitable means, the present drawing illustrates them as rotated from an electric motor 10, the motor having a small bevel gear 11 which meshes with a larger bevel gear 12 carried by the shaft. When the motor 10 is energized, the shaft 6 and disc 5 are rotated thereby at a relatively fast rate of speed and in the direction indicated by the arrow in Fig. 1.

Fish of different varieties are deposited on the rotating disc 5 by means of a chute 15, which has its lower delivery end disposed adjacent the center of the disc but spaced radially at a slight distance therefrom. As shown in Fig. 1, the delivery end of the chute 16 is cut at an angle, as indicated at 16, so that fish sliding from this end have the tendency to slide off more or less in the direction of rotation of the disc. Upon being deposited upon the disc 5, the fish are propelled radially outward under the influence of centrifugal force.

Disposed concentric with the axis of the disc 5 is a series of arcuate plates 20, 21, and 22. These plates constitute the sorting means and are carried by depending arms 23 of brackets 24 which, in turn, are supported by standards 25. The restraining plates 20, 21, and 22, are each adjustable vertically on their respective arms 23 by means of screws 26 which pass through slots 27 (Fig. 3), and thumb nuts threaded onto the screws. Since it is desirable that the outermost plate 22 have its lower edge disposed closely adjacent the upper surface of the disc, it is not essential that this plate be adjustable vertically. The innermost plate 20 may be provided with a V-shaped portion 28 adjacent its delivery end, if desired. Each plate has a straight portion 29 which extends tangentially of its curved portion. By this provision, a series of three delivery openings 30, 31, and 32, are provided through which the fish, moved in arcuate paths by the disc 5, are delivered to chutes 33, 34, and 35, which form continuations of the openings and which serve to convey the different varieties of fish to separate containers, or to subsequent fish-processing apparatus.

Assuming that the apparatus is to sort three different varieties of fish, that is, separate or grade fish having, for example, three different sizes, such as mackerel (large size), sardines (medium size), and anchovies (small size), the apparatus is adjusted to perform this function in the following manner. The arcuate plate 21 is adjusted vertically on its arm 23 to a position wherein its lower edge is spaced above the disc at a distance which is slightly greater than the thickness of the average anchovy so that fish of this variety can slide therebeneath, but the sardines, being of greater thickness than the space thus formed, cannot pass therethrough and are thus retained by the plate 21. The curved plate 20 is then adjusted vertically to a position wherein the space between its lower edge and the disc 5 is slightly greater than the thickness of a sardine, to permit the latter to slide radially therethrough, but smaller than the thickness of an average mackeral, to prevent the same from passing therethrough. The apparatus is then ready for operation.

The batch of fish, which includes the three varieties, namely, mackeral M, sardines S, and anchovies A, is fed onto the rotating disc 5 by the chute 15, and as each fish slides off from the end of the chute, the disc carries it forwardly in the direction of the arrow in Fig. 1. At the same time, centrifugal force, acting upon the fish, tends to move them outwardly in the manner of a centrifuge so that the fish travel in a curved path which is eccentric with respect to the axis of the disc. As each fish is moved in this manner, it slides under those plates 20 or 21 which are spaced above the disc at a distance which is greater than the thickness of that particular fish. Consequently, the mackeral M, being unable to pass under the innermost plate 20, are restrained from further outward radial movement, the sardines S, being able to pass under the plate 20 but not under the plate 21, are retained by the latter plate, and the anchovies A, which pass under both plates 20 and 21, are moved into engagement with the outermost plate 22. It is thus apparent that, during continued rotation of the disc 5, all the fish which are now resting against the plates 20, 21, and 22, are carried by the disc in concentric arcuate paths. Upon reaching the delivery openings 30, 31, and 32, the fish move tangentially of the disc 5 and are propelled into the individual chutes 33, 34, and 35, to be transported to any remote location for further processing.

It will be apparent from the foregoing that the present apparatus is capable of separating or grading several varieties of fish, in accordance with their sizes. While the machine has been described as adapted to sort three different specific varieties of fish, by way of example, it will be obvious that by providing a greater or lesser number of the arcuate plates and adjusting their height above the disc, in accordance with the thickness of the different varieties or species of the fish being processed, the machine can be made to separate a greater or lesser number of varieties of various sizes. The apparatus is extremely simple in construction and operation. And, since it has only one moving main part, namely, the disc 5, the possibility of breaking or derangement of parts is avoided, and the apparatus will operate over long periods of time without servicing. Moreover, the apparatus is entirely automatic and therefore requires little or no attention, except to maintain the supply of fish feeding to the disc, and thus the labor costs involved are reduced to a minimum. Furthermore, the apparatus can be minutely adjusted to meet the requirements, and thus may be made to separate the varieties of fish with extreme accuracy.

While I have herein shown and described the fish-sorting apparatus as embodied in a preferred form of construction, by way of example, it will be understood that various modifications might be made in the structure without departing from the spirit or scope of the invention. Therefore, I claim:

1. An apparatus for sorting elongate objects according to differences in their thicknesses, comprising: a horizontal rotatable disc; driving means for rotating said disc; delivery means for delivering the objects haphazardly onto said disc adjacent its axis of rotation; said objects being propelled radially outward on said disc under the influence of centrifugal force; and wall means defining a series of concentric, part-circular restraining elements associated with said disc and against which said objects are adapted to be moved and turned to cause them to lie on their sides and lengthwise of the inner surfaces of said elements due to the combined rotation of said disc and the centrifugal force, said elements being spaced radially from each other with respect to the axis of the disc and forming arcuate paths, the lower portions of said elements being arranged at progressively increased distances above the upper surface of said disc, with respect to a direction toward the axis of said disc, the objects being adapted to pass under only those elements which are spaced above said disc at a distance greater than their size, and adapted to be retained only by an element under which they are unable to pass so that the largest of said objects are retained by the innermost element and the smallest of said objects are retained by the outermost element of the series, said wall means defining a series of troughs into which the objects are moved in the direction of their length, one trough extending tangentially from each arcuate path to facilitate the discharge of the several sizes of objects, said troughs being disposed in side-by-side, substantially parallel, relationship.

2. An apparatus for sorting elongate objects according to differences in their thicknesses, comprising: a horizontal rotatable disc; driving means for rotating said disc; delivery means for delivering the objects haphazardly onto said disc adjacent its axis of rotation and at one side of said axis, said objects being propelled radially outward on said disc under the influence of centrifugal force; and wall means defining a series of concentric arcuate restraining elements associated with said disc and against which said objects are adapted to be moved and turned to cause them to lie on their sides and lengthwise of the inner surfaces of said elements due to the combined rotation of said disc and the centrifugal force, said elements being arranged in radially spaced relation concentrically about the axis of said disc and forming circular paths, the lower portions of said elements being arranged at progressively increased distances above the upper surface of said disc, with respect to a direction toward the axis of said disc, the objects being adapted to pass under only those elements which are spaced above said disc at a distance greater than their size, and adapted to be retained only by an element under which they are unable to pass so that the largest of said objects are retained by the innermost element and the smallest of said objects are retained by the outermost element of the series, said wall means defining a series of troughs into which the objects are moved in the direction of their length, one trough extending tangentially from each circular path to facilitate the discharge of the several sizes of objects, said troughs being disposed in side-by-side, substantially parallel, relationship, said troughs being disposed substantially at the same side of the axis of rotation as said delivery means.

ANDREW L. CHRISTIANSEN.

REFERENCES CITED

The following references are of record in the file of this patent:

UNITED STATES PATENTS

| Number | Name | Date |
|---|---|---|
| 474,930 | Wheelan | May 17, 1892 |
| 1,679,372 | Pease | Aug. 7, 1928 |
| 2,390,741 | Scott | Dec. 11, 1945 |

FOREIGN PATENTS

| Number | Country | Date |
|---|---|---|
| 2,904 of 1915 | Great Britain | Jan. 6, 1916 |
| 694,157 | Germany | July 26, 1940 |